No. 873,926. PATENTED DEC. 17, 1907.
R. DIESEL.
LONGITUDINALLY DISPLACEABLE CAR BODY FOR MOTOR VEHICLES.
APPLICATION FILED JAN. 25, 1907.

UNITED STATES PATENT OFFICE.

RUDOLF DIESEL, OF MUNICH, GERMANY.

LONGITUDINALLY-DISPLACEABLE CAR-BODY FOR MOTOR-VEHICLES.

No. 873,926.　　　　Specification of Letters Patent.　　　Patented Dec. 17, 1907.

Application filed January 25, 1907. Serial No. 353,957.

*To all whom it may concern:*

Be it known that I, RUDOLF DIESEL, a subject of the King of Bavaria, residing at Munich, Germany, have invented certain new and useful Improvements in Longitudinally-Displaceable Car-Bodies for Motor-Vehicles, of which the following is a specification.

There are already motor cars with which the laying open of the driving mechanism is effected by rearwardly displacing the car body or a part of same on guiding rails or slides; these constructions have the drawbacks, that the inevitable soiling and rusting of the guiding rails or slides greatly encumbers the use of the device, that if the guiding rails are not arranged exactly parallelly a squeezing takes place, and that several men for assistance are required. Further disadvantages consist in the fact that the car body cannot be shifted in the whole length from the car frame, thus the purpose being only partially achieved, and that on wholly removing the car body, either supports for supporting the part hanging over are required or it is necessary to put the car body completely aside which requires much attendance and space. Also such vehicles are known with which the car body can be tilted around a hinge or joint fixed to the car frame; in order to wholly lay open the driving mechanism, the tilting axis must be situated far backward; in consequence a great power for lifting the car body is required, i. e. much attendance or particular lifting devices.

The object of the present invention removes the drawbacks of the mentioned constructions, and consists in the arrangement of guiding rolls mounted on the car body, around which the car body, after having been correspondingly shifted, can be tilted towards the rear side.

Figure 1:
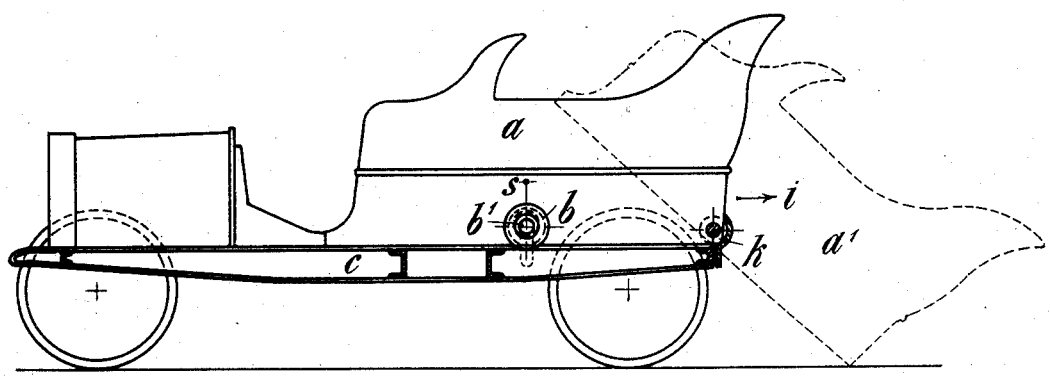
Figure 2:
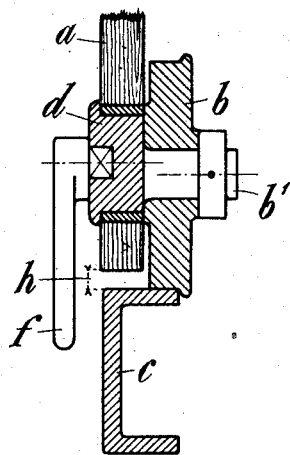

In the accompanying drawings, Figure 1 shows in side view a motor car provided with the new device, Fig. 2 illustrates a detail.

The car body *a* is provided with rolls *b* which are mounted approximately in the vertical transverse plane passing through the center of gravity *s* of the box. The rolls *b* may run on the longitudinal bars *c* of the frame or on particular rails. As may be seen from Fig. 2, the rolls *b* are mounted on the car body on eccentrical journals *b'* in such a manner that by turning a disk *d* eccentrical to the roll axis, by means of a fixed or removable handle *f* the whole car body can be lifted for the little amount *h* from the frame *c*. When lifted, the car body can swing about the roll axis *b'* (Fig. 1), and one man only is capable to draw out the whole car body in the direction of the arrow *i* Fig. 1.

The eccentric device shown in Fig. 2 for lifting the car body from the frame is only given as an instance; this lifting can be operated by any other means permitting a small displacement of the roller axles, such as screws, wedges, levers or any combination of known mechanisms.

The supporting rolls *b* are arrested in the point *k*, Fig. 1, by hook shaped catch pieces, and then the whole car body may be tilted into the position *a'* thereby the complete driving mechanism being laid open.

After the car body has been brought again into its normal position, the disk *d* (Fig. 2) is turned back, so that the car body *a* is replaced upon the frame *c*, and may then in ordinary manner be fastened to it by screws or other fastening means. Instead of arresting the rolls at the point *k*, also the journals of the rolls or special journals adapted to the box may be held fast; or the rolls at both sides of the car body may be mounted upon a common axle transversely extending through the car body, which axle may be arrested at the end of the car. The axes of the rolls lying approximately in the transverse vertical plane passing through the center of gravity of the box, only one man is sufficient to effect the displacement as well the tilting of the fully balanced car body. Further this operation requires the least space, and the driving mechanism is completely laid open.

What I claim as new and desire to secure by Letters Patent, is

In a motor car, a longitudinally displaceable car body, having rolls (*b*), approximately in the vertical transverse plane passing through its center of gravity, said rolls being swingingly or otherwise movably mounted on the car body for enabling a lifting of the car body from the frame, and catch pieces (*k*), mounted on the rear end of the underframing and arresting the rolls (*b*) when the car body, after having been displaced, is tilted towards the rear side.

In witness whereof, I have hereunto signed my name in the presence of two subscribing witnesses.

RUDOLF DIESEL.

Witnesses:
　WOLDEMAR HAUPT,
　HENRY HASPER.